524-141
4/28/87 RE 32,408

United States Patent [19]

Janiga

[11] E Patent Number: Re. 32,408

[45] Reissued Date of Patent: Apr. 28, 1987

[54] LIGNOSULFONATE-PHENOL-FORMALDEHYDE RESIN BINDER

[75] Inventor: Eugene R. Janiga, Roselle, Ill.

[73] Assignee: Masonite Corporation, Chicago, Ill.

[21] Appl. No.: 802,225

[22] Filed: Nov. 26, 1985

Related U.S. Patent Documents

Reissue of:

[64] Patent No.: 4,423,173
Issued: Dec. 27, 1983
Appl. No.: 427,841
Filed: Sep. 29, 1982

[51] Int. Cl.[4] ..... C08L 97/00; C08L 97/02; C08L 61/14; C08H 5/02

[52] U.S. Cl. ..... 524/14; 106/163.1; 524/595; 524/702; 524/841; 527/403

[58] Field of Search ..... 527/403; 524/14, 595, 524/702, 841; 106/163.1

[56] References Cited

U.S. PATENT DOCUMENTS

| | | | |
|---|---|---|---|
| 2,148,893 | 4/1939 | Bauer | 149/5 |
| 2,168,160 | 8/1939 | Hochwalt et al. | 260/53 |
| 2,562,898 | 8/1951 | Evans et al. | 260/17.3 |
| 2,819,295 | 1/1958 | Herrick et al. | 260/473.6 |
| 2,849,314 | 8/1958 | Goss | 92/3 |
| 2,975,126 | 3/1961 | Van Blaricom et al. | 252/8.5 |
| 3,013,933 | 12/1961 | Briggs | 162/68 |
| 3,037,902 | 6/1962 | Fahey et al. | 162/157 |
| 3,045,007 | 7/1962 | Mitchell et al. | 536/96 |
| 3,053,784 | 9/1962 | Herrick et al. | 260/29.3 |
| 3,054,705 | 9/1962 | Mitchell et al. | 154/43 |
| 3,058,975 | 10/1962 | Gaeschke | 260/231 |
| 3,095,392 | 6/1963 | Herrick | 260/17.5 |
| 3,174,896 | 3/1965 | Partlow | 162/38 |
| 3,185,654 | 5/1965 | Ball et al. | 260/17.5 |
| 3,200,070 | 8/1965 | Herrick | 252/8.5 |
| 3,232,700 | 2/1966 | Englund et al. | 23/48 |
| 3,271,382 | 9/1966 | Quimby | 260/124 |
| 3,305,433 | 2/1967 | Partlow | 162/80 |
| 3,423,395 | 1/1969 | Quimby | 260/209 |
| 3,451,998 | 6/1969 | Alexander et al. | 260/231 |
| 3,463,699 | 8/1969 | Broadhead | 162/163 |
| 3,505,243 | 4/1970 | Steinberg et al. | 252/353 |
| 3,513,068 | 5/1970 | Starr et al. | 162/76 |
| 3,560,331 | 2/1971 | Beelik | 162/76 |
| 3,658,638 | 4/1972 | Ludwig et al. | 161/262 |
| 3,790,442 | 2/1974 | Ashall | 161/198 |
| 3,886,101 | 5/1975 | Felicetta et al. | 260/17.5 |
| 3,940,352 | 2/1976 | Wennerblom et al. | 260/17.5 |
| 3,956,207 | 5/1976 | Blackmore et al. | 260/17.5 |
| 4,105,606 | 8/1978 | Forss et al. | 260/17.5 |
| 4,175,148 | 11/1979 | Luck et al. | 428/171 |
| 4,303,562 | 12/1981 | Hollis et al. | 260/17.5 |

*Primary Examiner*—Earl Nielsen
*Attorney, Agent, or Firm*—Mason, Kolehmainen, Rathburn & Wyss

[57] ABSTRACT

A method of manufacturing a lignosulfonate-phenol-formaldehyde resin includes heating a mixture of phenol, formaldehyde, lignosulfonate and alkali at a temperature of 60° C. to 100° C. and a pH of 8–13. The lignosulfonate comprises about 5 to about 80 percent of the total weight of phenol, formaldehyde and lignosulfonate and the lignosulfonate is mixed with said phenol and formaldehyde before substantial reaction between said phenol and said formaldehyde. Also disclosed are fibrous articles manufactured using this resin as a binder.

20 Claims, No Drawings

LIGNOSULFONATE-PHENOL-FORMALDEHYDE RESIN BINDER

Matter enclosed in heavy brackets [ ] appears in the original patent but forms no part of this reissue specification; matter printed in italics indicates the additions made by reissue.

FIELD OF THE INVENTION

The present invention relates to a lignosulfonate modified phenol-formaldehyde resin particularly useful in the formation of man-made boards and molded objects including fibers or fibrous particles bonded together with the lignosulfonate modified phenol-formaldehyde resin. More particularly, the present invention relates to a method of manufacturing a novel binding resin comprising phenol, formaldehyde, and about 30% to about 60by weight lignosulfonate added to the phenol and formaldehyde prior to any substantial amount of phenol-formaldehyde polymerization. The present invention also relates to the method of manufa^-turing fibrous and particle objects using this novel resin binder and to the method of manufacturing these articles.

BACKGROUND OF THE INVENTION AND PRIOR ART

Synthetic resin binders, such as phenol-formaldehyde, added in the manufacture of fiberboard, such as hardboard and particle board, represent a substantial portion of the coat of manufacture. Many attempts have been made to substitute all or a portion of such synthetic resin binders with less expensive components. For example, attempts have been made to utilize lignin-containing spent digestion liquors to form binding resins capable of bonding fibers and fibrous particles in the formation of a fiberboard, as set forth in U.S. Pat. Nos. 2,849,314 and 3,095,392. As set forth in the Guss U.S. Pat. No. 2,849,314, in spite of the many processes proposed for obtaining resinous compositions from sulfite liquor, for the most part such products have found little or no commercial application as thermosetting impregnating agents, binders or adhesives and particularly in the field of production of improved cellulosic and other fibrous materials.

In accordance with the Herrick U.S. Pat. No. 3,095,392, a lignosulfonate is added to a reacted mixture of phenol and formeldehyde to form a modified phenol-formaldehyde resin for use as a fluid loss control agent in drilling muds and portland cement slurries. In accordance with the Herrick method of manufacture of the lignosulfonate modified phenol-formaldehyde resins, the phenol and formaldehyde are permitted to react prior to the addition of the lignosulfonate.

In accordance with the principles of the present invention, it has been found that new and unexpected results are achieved in the formation of a lignosulfonate modified phenol-formaldehyde resin when the lignosulfonate is added to phenol and formaldehyde prior to a significant amount of reaction between the phenol and formaldehyde.

SUMMARY OF THE INVENTION

In brief, the present invention is directed to the manufacture of modified phenol-formaldehyde resins by substituting a portion of the phenol with a lignosulfonate. In accordance with an important feature of the present invention, the lignosulfonate should be in contact with the phenol and formaldehyde at the beginning of the reaction. Since lignosulfonate is a by-product of many pulping processes, it is economically desirable to substitute the lignosulfonate for phenol to provide the lignosulfonate-phenol-formaldehyde resin of the present invention.

In accordance with another important feature of the present invention, the lignosulfonate modified phenol-formaldehyde resin of the present invention can be used to bind fibers and fibrous particles in the production of fiberboard and other fibrous articles, such as insulation board and fiberglass mats, to provide new and unexpected strength, water resistance and dimensional stability.

Generally, in the manufacture of a phenol-formaldehyde resin two moles of phenol are reacted with one mole of formaldehyde. In accordance with the principles of the present invention, five to eighty percent by weight of this phenol can be substituted with a lignosulfonate and the mixture heated to form the lignosulfonate-phenol-formaldehyde resin of the present invention. Heating generally is carried out at a temperature of 60°÷100° C. for a period of 1-5 hours to achieve the lignosulfonate-phenol-formaldehyde resin of the present invention. To achieve the full advantage of the present invention, the lignosulfonate should be in contact with the phenol and formaldehyde in mixture prior to the formation of any substantial amount of phenol-formaldehyde polymer so that the lignosulfonate is available for reaction at the beginning of polymerization.

DETAILED DESCRIPTION OF THE PRESENT INVENTION

The lignosulfonate-phenol-formaldehyde resin of the present invention is prepared by mixing a lignosulfonate, phenol and formaldehyde and adding caustic, or some other chemical capable of liberating hydroxyl ions in water, thereby raising the pH to 8-13 to begin the polymerization reaction. To achieve the full advantage of the present invention, the caustic should be added in an amount sufficient to raise the pH of the reactant mixture to a value of about 9-11. The lignosulfonate is added to the reaction mixture prior to any substantial amount of phenol-formaldehyde condensation to achieve unexpected strength, water resistance and dimensional stability when the resin is used as a binder in the manufacture of fibrous articles.

The lignosulfonate may be relatively pure lignosulfonate or may contain a substantial quantity of, up to about 80%, impurities. For example, the lignosulfonate source may be a spent sulfite cooking liquor from the pulping of wood in the composition that the cooking liquor is recovered from the pulping process, or a lignosulfonate composition obtained by concentrating such spent sulfite cooking liquors. Modified lignosulfonates are also useful in forming the resins of the present invention. Such modified lignosulfonate products are unidentified complex polymeric materials derived from the components of spent sulfite liquor, as described in the Steinberg et al U.S. Pat. No. 3,505,243. The major solid component of a spent sulfite liquor is lignosulfonate and the liquor also contains a significant amount of carbohydrates and smaller amounts of waxes, resins and digestion chemicals. The lignosulfonates useful for reaction in manufacture of the lignosulfonate-phenol-formaldehyde resins of the present invention can be obtained from any spent sulfite liquor including sodium, calcium, ammonium, and magnesium based liquors. Further, spent alkaline (black) digestion liquors can be sulfited to provide a lignosulfonate source for polymerization in in accordance with the manufacture of the resins of the present invention. While such black liquors usually contain a larger percentage of non-lignin components, any lignosulfonate source having at least about 5% by weight lignosulfonate may be used for reaction, as is, without further concentration for reaction with phenol and formaldehyde in manufacturing the resins of the present invention. Further, when such resins are used as binders in fibrous articles made by the wet process, most of the non-functional impurities from the spent liquor, such as inorganic slats and the like, will be washed out through the mat during formation and any minor amount of impurities which are retained in the mat or sheet generally do not present a manufacturing problem and do not cause deterioration of the physical properties of the fibrous article.

In accordance with the method of the present invention, phenol, formaldehyde, water, and a lignosulfonate source, such as waste sulfite cooking liquor from the pulping process, are charged to a reactor equipped with a stirrer, thermometer, and condenser, and the mixture is warmed to about 45° C. At this point, a base capable of raising the pH of the reactant mixture, for example a caustic such as sodium hydroxide, is added to the mixture in a controlled manner to control the temperature rise to about 1° C. per minute. To achieve the full advantage of the present invention, the condensation is started with little or no alkali in the reaction mixture, and the alkali is added incrementally to control the condensation steadily until the desired degree of polymerization is achieved. After the temperature reaches about 90° C. (after about 45 minutes) the temperature of the reaction mixture is held constant for about 1 to 3 hours to achieve a desired degree of polymerization. The mixture is then cooled and diluted to about 20% solids or less to prevent further polymerization.

In accordance with an important feature of the present invention, the formaldehyde-phenol mole ratio in the reaction mixture should be in the range of 3.6–1.2 and the hydroxyl ion liberator (caustic) to phenol mole ratio in the reaction mixture should be in the range of 1.0–0.2. The amount of lignosulfonate can vary over a wide range of about 5–80% by total weight of phenol, formaldehyde, and lignosulfonate in the reaction mixture.

To achieve the full advantage of the present invention, the percentage by weight of phenol, formaldehyde and lignosulfonate based on the total weight of the reaction mixture should be in the range of 10–70% and the polymerization reaction should be carried out at a temperature in the range of about 60°–100° C.

In accordance with the following example 1 a lignosulfonate-phenol-formaldehyde resin was prepared by substituting 30% of the phenol with a lignosulfonate.

EXAMPLE 1

| 30% LIGNOSULFONATE SUBSTITUTION | | | | |
|---|---|---|---|---|
| Percent Solids | Reagent | Moles | Dry Grams | Wet Grams |
| 90 | Phenol | 1.0 | 94.0 | 104.4 |
| 50 | Waste Sulfite Liquor (50% ligno- | | 40.3 | 80.6 |

-continued

| 30% LIGNOSULFONATE SUBSTITUTION | | | | |
|---|---|---|---|---|
| Percent Solids | Reagent | Moles | Dry Grams | Wet Grams |
| | sulfonate) | | | |
| 37 | formaldehyde | 3.0 | 90.0 | 243.2 |
| 50 | Caustic (NaOH) | 0.5 | 20.0 | 40.0 |
| | Water | | | 142.5 |
| | | | | 244.3 |

All of the components except the caustic are charged to a reactor equipped with a stirrer, thermometer, and condenser. The components are mixed and warmed to 45° C. At this time, the caustic is added in such a manner as to control the temperature rise to 1° C. per minute. After the temperature reaches 90° C. (about 45 minutes), the temperature is held constant for 2 hours until the viscosity of the resin mixture reaches about 10 to about 200 centipoises. The mixture is then cooled and diluted to 20 percent solids.

In accordance with an important feature of the present invention, polymerization should be terminated when the reaction mixture reaches a viscosity in the range of about 10 centipoises to about 200 centipoises when measured at a pH of about 10.3. Resins polymerized in accordance with the present invention to a viscosity in the range of about 10 centipoises to about 200 centipoises will provide new and unexpected bonding between fibers and fibrous particles and, when used in the wet process to manufacture fiberboard or other water-laid fibrous sheets, will precipitate out of forming water, having a pH of about 5 or less, onto the fibers to provide new and unexpected bonding strength and bonding maintenance as evidenced by the internal bond, modulus of rupture and boil swell data set forth in the following tables.

To achieve the full advantage of the present invention, polymerization should be terminated when the reaction mixture reaches a viscosity in the range of about 10 centipoises to about 100 centipoises, measured at a pH of 10.3. Resins of the present invention prepared by terminating polymerization at a viscosity of about 20 to about 60 centipoises have provided new and unexpected bonding when used as a binder in the formation of fibrous products, such as fiberboard.

Polymerization can be terminated in any manner, such as by cooling the reaction mixture to about room temperature and diluting the mixture to about 20% solids, as set forth in Example 1. Dilution to about 10% to about 30% solids slows resin aging by slowing further polymerization to lengthen resin shelf life to at least about 1 month at room temperature.

The resin of example 1 was then compared to a typical phenol-formaldehyde resin in the manufacture of a fiberboard using typical binder incorporation levels of ¾% and 1%. It was found that the fiberboard manufactured with the resin binder of the present invention had new and unexpected physical characteristics of strength, water resistance and dimensional stability as indicated by the test data set forth in Table I.

TABLE I

| | 30% Lignosulfonatephenol formaldehyde Resin | | 100% Phenol-formaldehyde Resin | |
|---|---|---|---|---|
| Resin Level (%) | 1 | ¾ | 1 | ¾ |
| Specific | .912 | .898 | .926 | .898 |

TABLE I-continued

| | 30% Lignosulfonatephenol formaldehyde Resin | | 100% Phenol-formaldehyde Resin | |
|---|---|---|---|---|
| Gravity | 51.1 | 54.0 | 60.9 | 73.1 |
| One hour-boil swell | 160 | 128 | 101 | 89 |
| Internal Bond | 4069 | 4002 | 3295 | 3087 |
| Modulus of Rupture (psi) | | | | |

The above data clearly shows superior properties at a lower rate of resin usage in typical fiberboard manufacture using the lignosulfonate-phenol-formaldehyde resin of the present invention compared to a conventional phenol-formaldehyde resin. The lower boil swell and higher internal bond and modulus of rupture are evident at the 25% reduction of resin in the board.

To achieve the unexpected strength, water resistance and dimensional stability using the resin manufactured in accordance with the principles of the present invention in the formation of a fibrous article, the lignosulfonate should be reacted with the phenol and formaldehyde prior to any substantial polymerization between the phenol and formaldehyde. The first two rows of data, set forth in Table 2, were obtained from 7/16" fiberboard manufactured using 1% of the resin manufactured in accordance with Example 1 and the data set forth in the last two rows of table 2 was obtained from 7/16" boards manufactured using a resin made by introducing the lignosulfonate after the beginning of polymerization between the phenol and formaldehyde (lignosulfonate addition after 1.75 hours and after 2.25 hours of reaction). The total cook time for each resin is 2.5 hours. It is clear from Table 2 that new and unexpected results, both in terms of the one-hour boil test and the modulus of rupture, are obtained when the lignosulfonate is introduced to the reaction mixture prior to any substantial amount of reaction between the phenol and formaldehyde.

TABLE 2

| Parts Lignosulfonate | Parts Phenol | Parts Resin | Lignosulfonate Intro. | One-Hour Boil (%) | Modulus of Rupture (psi) |
|---|---|---|---|---|---|
| 30 | 70 | 1 | Immediately | 63.8 | 4.862 |
| 50 | 50 | 1 | Immediately | 62.5 | 5.285 |

TABLE 2-continued

| Parts Lignosulfonate | Parts Phenol | Parts Resin | Lignosulfonate Intro | One-Hour Boil (%) | Modulus of Rupture (psi) |
|---|---|---|---|---|---|
| 50 | 50 | 1 | After 2.25 hours | 85.2 | 4.404 |

The one hour boil test data were collected by boiling a 1×12 inch test sample for one hour, measuring the change in caliper of the sample and expressing the result as a percentage of expansion. The smaller boil values indicate superior performance. The modulus of rupture data were collected in accordance with ASTM-1037 and shows new and unexpected results for the lignosulfonate-phenol-formaldehyde resin manufactured by lignosulfonate addition prior to phenol-formaldehyde polymerization.

An easy test can be performed to determine how long the phenol and formaldehyde in caustic, aqueous solution can be heated without formation of the phenol-formaldehyde pre polymer in order to define, for the purpose of this disclosure, the point at which it is too late to add the lignosulfonate to achieve the new and unexpected results of the present invention. Phenol and formaldehyde is cooked in a caustic, aqueous solution for a given length of time and the pH then lowered to less than 5. If an emulsion does not occur when the pH is lowered below 5.0, then the mixture is only composed of starting materials and/or oligomers. If an emulsion begins to form, the polymerization has just begun.

In accordance with an important feature of the present invention, the lignosulfonate can be added to the phenol, formaldehyde, caustic aqueous mixture at any point in time up to, and including the formation of an emulsion when the pH of the reaction mixture (without lignosulfonate) is lowered to less than 5. Further heating past this point (emulsion or less, as defined by the above test) leads to a polymer having a measurable viscosity at 40% solids i.e. measureable with Gardner bubble tubes.

The data set forth in Table 3 shows the superiority of the resins manufactured in accordance with the present invention when the lignosulfonate is added prior to phenol-formaldehyde polymerization, as compared to resins manufactured when the lignosulfonate is added after the beginning of polymerization.

TABLE 3

| Degree of Pre-polymer | Substantially No Polymerization: Emulsion or Less | | | | Some Polymerization: Gardner Bubble Tube Capable of measuring Viscosity | | |
|---|---|---|---|---|---|---|---|
| Pre-polymer | Emulsion | Emulsion | None | Emulsion | A/B | A-1 | A-1 |
| Phenol-formaldehyde Ratio | 2.2 | 2.2 | 3.0 | 2.2 | 2.2 | 2.2 | 2.2 |
| Caust-Phenol Ratio | 0.32 | 0.32 | 0.52 | 0.32 | 0.32 | 0.32 | 0.32 |
| Total Cooking Time (hours) | 2 | 1.8 | 1.5 | 1.8 | 2.0 | 2.5 | 2.5 |
| % Lignosulfonate Substitution | 30 | 40 | 40 | 50 | 30 | 40 | 50 |
| Test Results: | | | | | | | |
| One-Hour Boil (%) | 57.1 | 56.7 | 56.4 | 64.3 | 61.2 | 72.1 | 90.8 |
| Modulus of Rupture (psi) | 5341 | 4,569 | 5,101 | 4,936 | 4,840 | 4,159 | 4,297 |

What is claimed:

1. A method of manufacturing a lignosulfonate-phenol-formaldehyde resin comprising heating a mixture of phenol, formaldehyde, lignosulfonate and alkali wherein said lignosulfonate comprises about 5 to about 80 percent of the total weight of phenol, formaldehyde and lignosulfonate, *said lignosulfonate consisting essentially of the lignosulfonates in a waste sulfite or sulfited cooking liquor as recovered from a pulping process*, and wherein said lignosulfonate is mixed with said phenol and formaldehyde under alkaline conditions before substantial reaction between said phenol and said formaldehyde; and heating said mixture to form a lignosulfonate-phenol-formaldehyde polymer.

2. The method of claim 1 wherein said mixture is heated at a temperature of 60° C. to 100° C. and at a pH of 8–13 to form said polymer.

3. The method of claim 1 wherein said phenol, formaldehyde and lignosulfonate are mixed prior to heating.

4. The method of claim 1 wherein said lignosulfonate comprises abouit 30% to about 60% by total weight of lignosulfonate, phenol and formaldehyde.

5. The method of claim 1 wherein said lignosulfonate comprises about 40% to about 50% by total weight of lignosulfonate, phenol and formaldehyde.

6. A method of manufacturing a man-made board comprising contacting a plurality of fibers with a lignosulfonate-phenol-formaldehyde resin and hot pressing said resin contacted fibers together to cause said fibers to adhere to each other in a desired configuration, wherein said resin is formed by heating a mixture of lignosulfonate, phenol and formaldehyde, *said lignosulfonate consisting essentially of the lignosulfonates in a waste sulfite or sulfited cooking liquor as recovered from a pulping process*, said lignosulfonate being added to said phenol and formaldehyde under alkaline conditions before a substantial amount of reaction between said phenol and said formaldehyde and heating said mixture to form said polymer.

7. The method of claim 6 wherein said mixture is heated at a pH of 8–13 for a period of time sufficient that said polymer has a viscosity in the range of 10 to 200 centipoises and then cooling the reaction mixture to retard further polymerization.

8. A method of molding a fibrous object having a predetermined configuration comprising disposing a fiber-resin composition in a mold cavity, closing said mold cavity and applying heat and pressure to said composition to adhere said composition together into said predetermined configuration, wherein said fiber-resin composition comprises a plurality of fibers and a lignosulfonate-phenol-formaldehyde resin formed by mixing a lignosulfonate, phenol and formaldehyde to form a reaction mixture adding alkali incrementally to control the temperature rise of the mixture during reaction and heating said mixture to polymerize said mixture, *said lignosulfonate consisting essentially of the lignosulfonates in a waste sulfite or sulfited cooking liquor as recovered from a pulping process*, said lignosulfonate being added to said mixture under alkaline conditions before a substantial amount of reaction between said said phenol and said formaldehyde.

9. The method of claim 8 wherein said lignosulfonate comprises about 50% to about 80% by total weight of lignosulfonate, phenol and formaldehyde in said resin mixture.

10. The method of claim 9 wherein said lignosulfonate comprises about 40% to about 60% by total weight of lignosulfonate, phenol and formaldehyde in said resin mixture.

11. The method of claim 8 including heating said resin mixture at a temperature of about 85° to about 95° C. to form said polymer.

12. An article of manufacture comprising a plurality of fibers adhered together under heat and pressure with a lignosulfonate-phenol-formaldehyde resin wherein said resin is formed by mixing a lignosulfonate, phenol, formaldehyde, and an alkali to form a reaction mixture and heating said mixture to polymerize said mixture, *said lignosulfonate consisting essentially of the lignosulfonates in a waste sulfite or sulfited cooking liquor as recovered from a pulping process*, said lignosulfonate being added to said reaction mixture before a substantial amount of reaction between said phenol and said formaldehyde.

13. The article of claim 12 wherein said lignosulfonate comprises about 30% to about 60% by total weight of lignosulfonate, phenol and formaldehyde in said resin mixture.

14. The article of claim 12 wherein said lignosulfonate comprises about 40% to about 50% by total weight of lignosulfonate, phenol and formaldehyde in said resin mixture.

15. The article of claim 12 wherein fibers include cellulosic fibers.

16. The article of claim 15 wherein said cellulosic fibers are wood fibers.

17. The article of claim 12 wherein said fibers include fiberglass.

18. A lignosulfonate-phenol-formaldehyde resin formed by heating a mixture of phenol, formaldehyde, a lignosulfonate and alkali wherein said lignosulfonate comprises about 5 to about 80 percent of the total weight of phenol, formaldehyde and lignosulfonate, *said lignosulfonate consisting essentially of the lignosulfonates in a waste sulfite or sulfited cooking liquor as recovered from a pulping process*, and wherein said lignosulfonate is mixed with said phenol and formaldehyde under alkaline conditions before a substantial amount of reaction between said phenol and said formaldehyde; and heating said mixture at a temperature of 60° C. to 100° C. to form a lignosulfonate-phenol-formaldehyde polymer;

cooling said reaction mixture when the viscosity reaches 10 to 200 centipoises to retard further polymerization.

19. The resin of claim 18 wherein the reaction mixture is diluted to 10 to 30% solids after the viscosity of the reaction mixture reaches 10 to 200 centipoises to prevent further polymerization.

20. The resin of claim 19 wherein the reaction mixture is diluted with water.

* * * * *